(12) United States Patent
Yang et al.

(10) Patent No.: US 6,511,527 B2
(45) Date of Patent: Jan. 28, 2003

(54) METHOD OF TREATING EXHAUST GAS

(75) Inventors: Ralph T. Yang, AnnArbor, MI (US); Ruiqiang Long, AnnArbor, MI (US); Tomonori Takahashi, Chita (JP)

(73) Assignee: NGK Insulators, Ltd., Nagoya (JP)

( * ) Notice: Subject to any disclaimer, the term of this patent is extended or adjusted under 35 U.S.C. 154(b) by 47 days.

(21) Appl. No.: 09/777,607

(22) Filed: Feb. 6, 2001

(65) Prior Publication Data

US 2002/0134242 A1 Sep. 26, 2002

(51) Int. Cl.[7] .................................................. B01D 53/06
(52) U.S. Cl. .............................. 95/107; 95/133; 96/150
(58) Field of Search ........................... 95/107, 111, 288, 95/133, 141; 96/123, 150

(56) References Cited

U.S. PATENT DOCUMENTS

| | | | | |
|---|---|---|---|---|
| 4,502,396 A | * | 3/1985 | Teller | |
| 4,889,698 A | * | 12/1989 | Moller et al. | |
| 5,113,772 A | | 5/1992 | Karasek' | |
| 5,439,508 A | * | 8/1995 | Mayer-Schwinning et al. | |
| 5,505,766 A | * | 4/1996 | Chang | |
| 5,514,356 A | * | 5/1996 | Lerner | |
| 5,626,650 A | * | 5/1997 | Rodriguez et al. | |
| 5,843,205 A | * | 12/1998 | Yoshino | |
| 6,279,491 B1 | * | 8/2001 | Takahashi et al. | |
| 2002/0010382 A1 | * | 1/2002 | Taylor | |

FOREIGN PATENT DOCUMENTS

| | | |
|---|---|---|
| EP | 0 764 457 A2 | 3/1997 |
| JP | 4-87624 | 3/1992 |
| JP | 8-243341 | 9/1996 |
| JP | 9-29046 | 2/1997 |
| JP | 9-75667 | 3/1997 |
| JP | 9-75719 | 3/1997 |
| JP | 9-2678534 | 8/1997 |
| JP | 9-248425 | 9/1997 |

\* cited by examiner

*Primary Examiner*—Duane S. Smith
(74) *Attorney, Agent, or Firm*—Burr & Brown

(57) ABSTRACT

A method of removing dioxins from an exhaust gas, including the steps of introducing carbon nanotubes into a stream of the dioxin-containing exhaust gas, and sorbing dioxins on the carbon nanotubes.

7 Claims, 1 Drawing Sheet

Fig. 1 - Prior Art
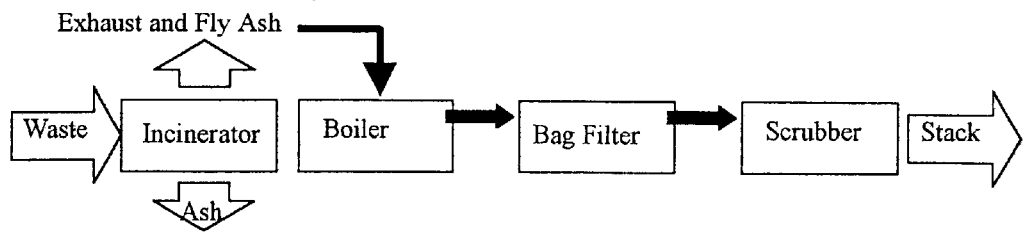
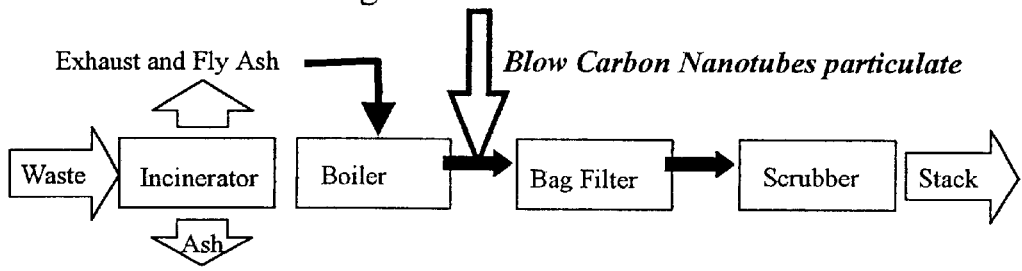
Fig. 2
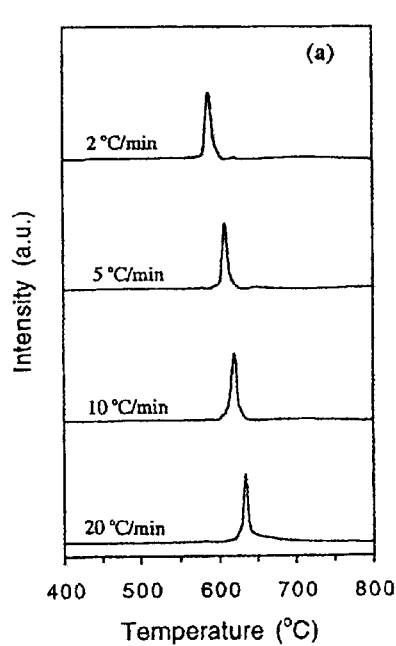
Fig. 3
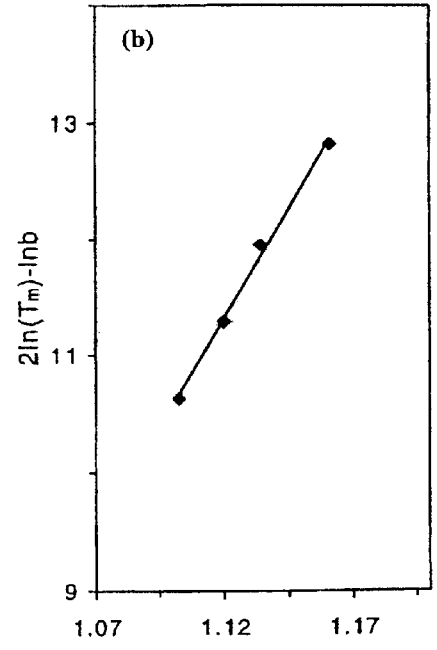
Fig. 4

METHOD OF TREATING EXHAUST GAS

BACKGROUND OF THE INVENTION

The present invention relates to a method for treating an exhaust gas, in particular a dioxin-containing exhaust gas emitted from a waste incinerator. Dioxins are mainly generated from combustion of organic compounds in waste incinerators, such as municipal waste, medical waste, hazardous waste, and army stockpile (chemical agents).

FIG. 1 is a diagram illustrating a typical method for removing particulate matter (e.g., flyash) from exhaust gas produced by a waste incinerator. Burning waste (e.g., municipal waste) in an incinerator creates byproducts of (i) ash and (ii) exhaust gas and flyash, the former residing in the incinerator itself and the latter passing through the stack of the incinerator. It is standard operating procedure to flow the exhaust gas and flyash through a boiler to quench the exhaust gas and reduce the temperature thereof to a sufficiently low level so that a bag filter can be used to remove the flyash from the exhaust gas. The resultant exhaust gas is then passed through a scrubber and emitted to the environment through a stack.

It is well known that the incineration of municipal waste materials creates large volumes of organic compounds and hydrocarbons. These materials serve as precursors for various compounds, some of which are highly toxic. For example, aromatic compounds such as phenol or benzene, or chlorinated aromatic compounds such as chlorophenol or chlorobenzene, react in the presence of flyash to form dioxin, which is highly toxic. They are formed downstream of the combustion zone and decompose at temperatures only above 1200° C. The typical concentrations in the effluents from incinerators are in the range of 10–500 ng/Nm$^3$.

Current regulations on dioxin emissions are complex, depending on the toxic equivalency of the actual compounds and $O_2$ concentration, and vary in different countries. Nonetheless, removal to well below 1 ng/Nm$^3$ is generally required. Since 1991, activated carbon adsorption has been widely adopted for dioxin removal from municipal and other waste incinerators in Europe and Japan.

It is believed that formation of dioxin in the presence of flyash is the result of a catalytic reaction wherein flyash is the catalyst. It is also believed that the catalytic reaction occurs when the temperature of the exhaust gas drops below 400° C., which typically occurs at a location between the boiler and the bag filter.

While it would seem logical to simply remove the flyash from the exhaust gas before the temperature of the exhaust gas drops below 400° C., and thus prevent the formation of dioxin in the first instance, there is no industrially practical method or apparatus for accomplishing such a goal. Accordingly, the industry has adopted various methods by which dioxin is removed from incinerator exhaust gas prior to being emitted to the environment through the stack of the incinerator.

The use of sorbent materials is the most common method for removing dioxin from incinerator exhaust gas. Sorbents are materials that adsorb or absorb dioxin or dioxin precursors, and examples of such sorbents include certain cements (JP 97-2678543 B), activated carbon and activated white clay (JP 92-87624 A and JP 96-243341 A), activated coke (JP 97-29046 A), silicates (JP 97-75719 A and JP 97-75667 A), and zeolites (JP 97-248425 A).

While it is most common to add such sorbents to the exhaust gas at an exhaust gas temperature of less than 400° C., to thereby sorb dioxin per se, another known method (EP 0 764 457) discloses adding sorbents to the exhaust gas at an exhaust temperature of greater than 400° C. to remove dioxin precursors from the exhaust gas. Subsequent to the sorption, the sorbent may be removed from the exhaust stream and heated to decompose the dioxin. Typically, this occurs above 600° C.

While all of the above-described methods are effective to remove dioxin from the exhaust gas to some degree, there are problems associated with each method. The main problem with using activated carbon-based sorbents is that they release dioxin at lower temperatures and thus have the potential to desorb prematurely and be emitted out of the incinerator stack. The dioxin-containing atmosphere resulting from the use of activated carbon thus needs to be managed to a level of precision too great to be of practical use in a large scale manufacturing process.

The problem with using other sorbents such as silicates and zeolites, for example, is that the desorption temperature of those materials is too close to the vaporization temperature of dioxin itself. Specifically, the vaporization temperature of dioxin is about 220° C., whereas the temperature at which dioxin desorbs from materials such as silicates and zeolites ranges from about 220° C. to 260° C. Sorption of dioxin is most effective when the dioxin is in a gaseous state, and the sorption efficiency of a sorbent depends largely upon how close the dioxin desorption temperature of the material is to the vaporization temperature of dioxin. Accordingly, the sorption efficiency of materials such as silicates and zeolites is relatively poor, because the desorption temperature of those materials is too close to the vaporization temperature of dioxin.

It would be desirable to provide a method for removing dioxin from incinerator exhaust gases without the problems of post-sorbtion treatment (associated with activated carbon) and of sorption inefficiency (associated with materials such as silicates and zeolites). Desirable is a sorbent which sorbs dioxin more strongly, and desorbs dioxin at a higher temperature (near or greater than the decomposition temperature of dioxin). To date, however, the industry has not provided any such method or sorbent.

SUMMARY OF THE INVENTION

It is an object of the present invention to provide a method for removing dioxin from an exhaust gas that overcomes the above-discussed problems associated with the prior art methods.

In accordance with one embodiment of the present invention, carbon nanotubes are used as a sorbent to remove dioxin from an exhaust gas.

In accordance with another embodiment of the present invention, a method of removing dioxin from an exhaust gas includes the steps of introducing carbon nanotubes into a stream of the dioxin-containing exhaust gas, and sorbing dioxin on the carbon nanotubes.

The inventors discovered that carbon nanotubes sorb dioxin more strongly than activated carbon, and, thus, can be used effectively as a sorbent of dioxin contained in an exhaust gas. Additionally, since dioxin desorbs at a higher temperature from carbon nanotubes than from activated carbon, it is easier and more effective to deompose the dioxin during the post-sorption treating step to remove the dioxin form the sorbent material.

The inventors have discovered that carbon nanotubes are better sorbents for dioxin than activated carbon insofar as the nanotubes desorb dioxin at a higher temperature than the activated carbon. This provides for easier handling of the dioxin-containing exhaust and provides for more efficient post-sorption treatment of the dioxin-sorbed sorbent material. The desorption temperatures of carbon nanotubes and activated carbon, using the well-known temperature-programmed desorption (TPD) technique, are shown in Table I.

TABLE I

| Sorbent | Heating rate (° C./min) | | | |
|---|---|---|---|---|
| | 2 | 5 | 10 | 20 |
| Desorption temperature from carbon nanotubes (C.) | 588 | 609 | 620 | 634 |
| Desorption temperature from activated carbon (C.) | 481 | 517 | 543 | |

The principal problem associated with the use of activated carbon is that of desorption of the dioxin prior to its decompostion. Table I demonstrates that, regardless of the heating rate, carbon nanotubes desorb dioxin at a higher temperature than that of activated carbon. Thus, when attempting to decompose the dioxin, carbon nanotubes do not require strict atmospheric control, or inordinately steep heating rates. The use of carbon nanotubes therefore is easier and less expensive in treating exhaust gas.

The carbon nanotubes used in the present invention may be either of the single-wall or multi-wall variety. The walls are typically comprised of hexagonal arrays of carbon atoms in graphene sheets that surround the tube axis. It is believed that a strong interaction between the benzene ring of dioxin and the surface of the carbon sheet is responsible for the strong sorption characteristics.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which:

FIG. 1 is a diagram illustrating a conventional waste incinerator system;

FIG. 2 is a diagram illustrating a waste incinerator system, where carbon nanotubes are introduced into the exhaust gas stream upstream of the bag filter;

FIG. 3 are temperature-programed desorption (TPD) curves of dioxin with activated carbon and carbon nanotubes; and FIG. 4 is a plot showing the relationship between the maximum desorption temperature (Tm) and heating rate (b) for dioxin and carbon nanotubes.

DETAILED DESCRIPTION OF THE INVENTION

FIG. 2 is identical to the diagram shown in FIG. 1, but shows the location of where carbon nanotubes in particulate form would be introduced into the exhaust gas stream, in the same manner as activated carbon of the prior art. It is preferable to granulate the carbon nanotubes to improve the handling and flow properties of the powder. It is also preferable to introduce the nanotubes at this location so as to make use of the collection function of the gas bag filter that is typically standard equipment in munnicipal waste incinerator systems. It is possible to introduce the particulate carbon nanotube material downstream of the bag filter, but such an operation would require a secondary filter to collect them.

While the exact configuration of the carbon nanotubes is not critical, it is preferred that they have an average particle diameter of 1 to 100 microns. It is also preferred, from the viewpoint of handling ease, that the carbon nanotubes have a granulated particle size of 1 micron to 100 microns. The diameter of single-wall carbon nanotubes is usually 1–5 nm, while the diameter of multi-wall carbon nanotubes is greater.

The volume of particulate carbon nanotubes introduced into the exhaust stream depends on the volume of exhaust gas to be treated and the concentration of toxic material to be removed. Generally speaking however, a sufficient amount of carbon nanotubes should be added to provide for 0.3 $m^2$ surface area of carbon nanotubes for every 1 $Nm^3$ of exhaust gas to be treated. This is in comparison to 3 $m^2$ surface area in the case of using activated carbon (i.e., the sorption capacity of carbon nanotubes is approximately 10 times that of activated carbon).

After the dioxin has been sorbed by the carbon nanotubes, that material is collected in the bag filter along with the flyash and is heated up to a temperature exceeding 500° C. to desorb the dioxin from the carbon nanotubes and thermally decompose the dioxin into non-toxic byproducts, which can then be emitted into the environment through the incinerator stack.

EXAMPLE

The following example is provided to illustrate the inventive concepts of the present invention, and is not intended to in any way limit the present invention in scope or spirit.

TPD experiments of dioxin were carried out from room temperature to 800° C. at different heating rates from 2 to 20° C./min. In each experiment, 0.1 g of carbon nanotubes was loaded in a stainless steel tubing (⅛-in) with an inner diameter of 2 mm. The length of the column was approximately 5 cm. Non-chloro dioxin was used as the model compound for dioxins. Dioxin solution in N,N-dimethylformamide (DMF: 5 ml) was used as the adsorbate. The solution consisted of 50 mg of diberizo-p-dioxin (99%, Chem. Service Co.) dissolved in 1 ml of DMF (99.8%, Aldrich). The solution was then loaded at the inlet of the sorbent column and the column was purged with helium (50 ml/min) at room temperature. The He gas (ultra high purity) was pretreated with a 5 A molecular sieve column and a model 1000 oxygen trap column before entering the sorbent column.

Subsequently, the sample was heated in the He flow at a constant heating rate. As the temperature was increased, the dioxin at the inlet was vaporized and was subsequently adsorbed in the carbon nanotubes bed. As the temperature was further increased, the dioxin was eventually desorbed. The effluent or the desorption products were analyzed continuously by both a thermal conductivity detector (TCD) and a flame ionization detector (FID) in a gas chromatograph. The tubes between the sorbent column and TCD/FID detectors were heat treated at 300° C. to prevent deposition of dioxin (b.p. 266° C. and m.p. 122° C.).

The carbon nanotubes were prepared using catalytic decomposition of methane. The obtained material was treated with 6M nitric acid for 24 h to dissolve the catalyst particles and then calcined at 400° C. for 1 h in air. Transmission electron microscopy images showed that the ends of some of the prepared carbon nanotubes were open. The carbon nanotubes have a BET surface area of 155 $m^2/g$ and a pore size distribution from 2.5 to 30 nm (with the first peak at 2.9 mn), obtained from $N_2$ adsorption isotherms at—196° C.

FIG. 3 shows the TPD spectra of dioxin on carbon nanotubes at different heating rates. The peak desorption temperatures are substantially higher than all other known sorbents, suggesting very strong interactions between dioxin and carbon nanotubes. The maximum desorption temperature increased from 588 to 634° C. as the heating rate was increased from 2° C./min to 20° C./min. According to the following equation $$2\ln T_m - \ln b = \frac{E}{RT_m} + \ln Z$$

(where $T_m$ is the peak desorption temperature, b is heating rate, E is activation energy for desorption, R is gas constant and Z is a constant that depends on the desorption kinetics), the activation energy for dioxin desorption can be calculated. The plot of [2 In $T_m$–In b] vs. $1/T_m$ is given in FIG. 4. From this plot, the activation energy (E) for desorption of dioxin on the carbon nanotubes is 315 kJ/mol.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of using carbon nanotubes to remove dioxins from an exhaust gas.

2. A method of removing dioxins from an exhaust gas, comprising the steps of:

introducing carbon nanotubes into a stream of dioxin-containing exhaust gas; and sorbing dioxins on the carbon nanotubes.

3. The method of claim 2, wherein said carbon nanotubes are introduced into the stream of dioxin-containing exhaust gas at an exhaust gas temperature of not greater than 300° C.

4. The method of claim 3, wherein said carbon nanotubes are introduced into the stream of dioxin-containing exhaust gas at an exhaust gas temperature of not less than 100° C.

5. The method of claim 2, further comprising the step of passing the stream of dioxin-containing exhaust gas through a filter to remove particulate matter therefrom, and said carbon nanotubes are introduced into the stream of dioxin-containing exhaust gas at a position upstream of the filter.

6. The method of claim 2, further comprising the step of passing the stream of dioxin-containing exhaust gas through a filter to remove particulate matter therefrom, and said carbon nanotubes are introduced into the stream of dioxin-containing exhaust gas at a position downstream of the filter.

7. The method of claim 2, wherein said carbon nanotubes are introduced into the stream of dioxin-containing exhaust gas in particulate form.

* * * * *